United States Patent [19]

Schröder

[11] Patent Number: 4,606,053

[45] Date of Patent: Aug. 12, 1986

[54] BI-PHASE DECODER

[75] Inventor: Wolfgang Schröder, Pforzheim, Fed. Rep. of Germany

[73] Assignee: International Standard Electric Corporation, New York, N.Y.

[21] Appl. No.: 523,543

[22] Filed: Aug. 16, 1983

[30] Foreign Application Priority Data

Aug. 19, 1982 [DE] Fed. Rep. of Germany ....... 3230836

[51] Int. Cl.⁴ .................... H03M 5/12; H04L 7/02
[52] U.S. Cl. ........................ 375/87; 375/55;
375/110; 307/269; 328/63; 360/42
[58] Field of Search .............. 375/110, 106, 87, 55;
328/63, 72, 74; 307/269; 329/109; 360/42, 43

[56] References Cited

U.S. PATENT DOCUMENTS 3,967,061  6/1976  Dobias ........................ 375/110
4,513,329  4/1985  Gomez et al. ................ 360/42

Primary Examiner—Marc E. Bookbinder
Assistant Examiner—Andrew J. Telesz, Jr.
Attorney, Agent, or Firm—John T. O'Halloran; Thomas F. Meagher

[57] ABSTRACT

A facility is provided for recovering the clock and data from a data stream transmitted in the bi-phase code even if the data stream contains no sync bits and if the transmission speed varies.

For clock recovery, a nonretriggerable monostable multivibrator is triggered at each phase change, so that the inserted phase changes are rendered ineffective. The clock is used to control a memory which receives the valid data of the transmitted data stream at the correct instant and keeps this data constant during one clock period.

2 Claims, 9 Drawing Figures

BI-PHASE DECODER

BACKGROUND OF THE INVENTION

The present invention relates to an evaluating circuit for a data stream transmitted in the bi-phase code.

In digital data systems, the type of code used is an important factor. For the conversion from analog to digital values, for example, different codes may be employed (e.g., BCD or Gray code). Also, the question as to whether the possible states (mostly two) should be characterized by different currents, voltages, frequencies or the like can be answered differently depending on the particular requirement. Successive data pulses give a data stream in which different states follow each other in time (during transmission) or in space (on a recording medium). The information may be contained either in the successive states or in the changes of state. The latter system is mostly employed if simple, AC-coupled amplifiers are used, or if the clock must be recovered in the transmitted data stream. To recover the data from a transmitted data stream, it is necessary to determine whether a change of state occurs in one direction (e.g., as a voltage rise) or in the other (e.g., as a voltage drop) at a given instant. Accordingly, if the same value is to be transmitted twice in succession, there must be two changes of state in the same direction. In the meantime, there must necessarily be a change of state in the opposite direction. This additional change of state must be detected and suppressed during evaluation. This requires a fixed time (or spatial) distance between the valid changes of state. Any additional changes of state which may be necessary but are invalid for the data contents will then lie approximately midway between two valid changes of state and, thus, can be detected and suppressed if the data clock is known.

The data stream representation just mentioned is called "bi-phase code"; the states occurring are referred to as "phases", and the changes of state as "phase changes".

To store data in connection with so-called home computers, use is frequently made of tape recorders as are commonly employed in entertainment electronics. Such recorders exhibit flutter. To recover the clock required to recover the data, it is common practice to insert, at regular, relatively short time intervals, synchronization intervals with which a free-running clock generator on the evaluation side is synchronized. To generate and store this additional synchronizing signal, additional circuitry and, above all, additional type material are required.

With a known circuit, the CD4037A of RCA, the data transmitted in the bi-phase code can be recovered if the clock is known. However, this circuit suffers from the drawback that the phase changes that are insignificant for the information content are not completely suppressed. The result in short-duration interference pulses at the output.

SUMMARY OF THE INVENTION

The object of the invention is to improve and simplify the evaluation of a data sream transmitted in the bi-phase code. In particular, the clock recovery necessary for data recovery is to be possible without additional synchronizing signals.

According to the invention, the evaluating circuit comprises a clock recovery circuit containing one or more detectors whereby the instants of all phase changes are determined, and the clock recovery circuit contains a generator which generates a clock pulse shorter than the shortest permissible distance between two valid changes of state and longer than half the longest permissible distance between two valid changes of state whenever a phase change is detected by the detector(s) and if the preceding clock pulse has ended.

For the further evaluation of the data stream, it may be necessary to determine the instants of the phase changes for the two directions (e.g., leading edge and trailing edge) separately. For this purpose, two separate detectors are used.

The clock-pulse generator is advantageously a nonretriggerable monostable multivibrator in which each detected phase change triggers a clock pulse if the preceding clock pulse has already ended. With two or more detectors it makes no difference which of the detectors detects the respective phase change.

To keep the data that are extracted with the aid of the recovered clock free from interference pulses, which are caused mainly if an additional phase change whose direction says nothing about the data content has to be inserted into the transmitter data stream, a data recovery circuit advantageously contains a storage element into which a new value from the data stream is transferred at every clock pulse.

In one embodiment of the invention, the storage element is an SR flip-flop which is set via its set input S when a phase change occurs in one direction (e.g., as a voltage rise) at an instant determined by the clock signal as the succession of clock pulses, and which is reset via its reset input R when a phase change occurs in the other direction (e.g., as a voltage drop) at an instant determined by the clock signal. Advantageously, this instant determined by the clock is delayed with respect to the beginning of a clock pulse to the point that propagation delays in the evaluating circuit have no effect.

In a further embodiment, the storage element is a D flip-flop into which the applied data is transferred at an instant determined by the clock. This embodiment can be used, for example, if the instants of the phase changes are not determined separately for the two directions. This will be the case, for example, if two or more data streams are transmitted in parallel at the same clock rate, in which case it suffices to recover a clock from only one of these data streams and to use it to recover the data of the other data streams.

BRIEF DESCRIPTION OF THE DRAWING

An embodiment of the invention will now be explained in more detail with reference to the accompanying drawings, in which.

DETAILED DESCRIPTION OF THE PREFERRED EMBODIMENT

Figure 1:
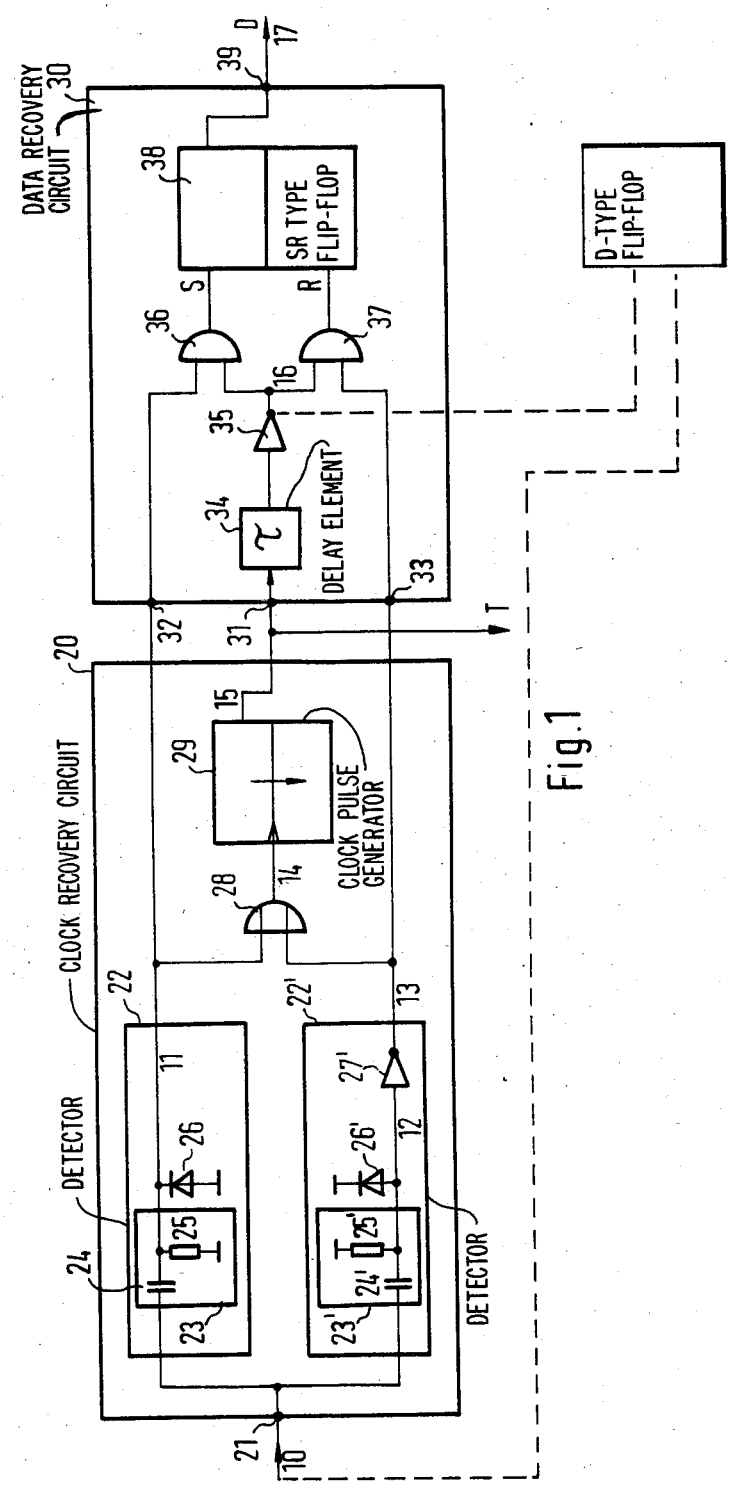
FIG. 1 shows a circuit according to the invention for evaluating a data stream transmitted in the bi-phase code.

FIG. 1 shows the signal path 10 . . . 17 through the parts 21 . . . 29 of a clock recovery circuit 20, and through the parts 31 . . . 39 of a data recovery circuit 30.

At the input 21 of the clock recovery circuit 20, the transmitted data stream 10 (FIG. 2a) divides and passes through two detectors 22 and 22' of virtually the same design. In both detectors, a signal is first differentiated in a differentiator 23, 23', which consists of a series capacitor 24, 24' and a shunt resistor 25, 25'. A following diode 26 in the detector 22 and a following diode 26' in the other detector 22' filter out the positive-going and negative-going needle pulses, respectively. This can be done either by connecting the diodes 26 and 26' across the outputs of the differentiators 23 and 23', respectively, thereby eliminating the respective undesired pulse (see FIG. 1), or by connecting the diodes in series with the differentiator outputs, thus blocking the respective undesired pulse. In the detector 22', the signal is then inverted by an inverter 27'. The outputs of the detectors 22 and 22' are connected to the inputs of an OR gate 28. The latter has its output connected to the input of a nonretriggerable monostable multivibrator 29. The dwell time of the monostable multivibrator is shorter than the shortest permissible distance between two valid changes of state and longer than half the longest permissible distance between two valid changes of state.

The output of the monostable multivibrator 29 is connected to the clock input 31 of the data recovery circuit 30. The clock T can be picked off there for other purposes. Coming from the clock input 31, the clock passes through a delay element 34 and then through an inverter 35. Two data inputs 32 and 33 are connected to the outputs of the detectors 22 and 22', respectively. Two AND gates 36 and 37 each have one of their two inputs connected to the two data inputs 32 and 33, respectively. The other inputs of the AND gates 36 and 37 are connected to the output of the inverter 35. The outputs of the AND gates 36 and 37 are connected to the set input S and the reset input R, respectively, of an SR flip-flop 38, which has its output coupled to the data output 39 of the data recovery circuit 30.

Figure 2A:
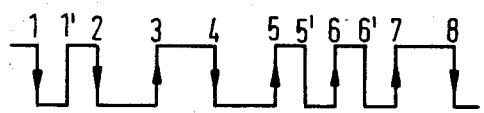
FIGS. 2a–2h show a timing diagram for the circuit of FIG. 1.
Figure 2B:
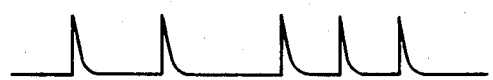
Figure 2C:
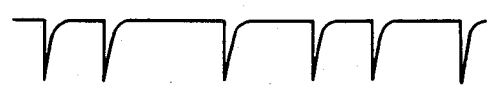
Figure 2D:
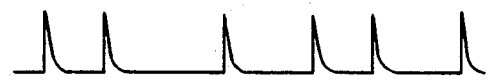
Figure 2E:
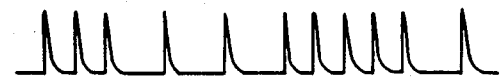
Figure 2F:

FIG. 2a shows the transmitted data stream 10 applied to the input 21 of the clock recovery circuit 20. The directions of the phase changes at the instants designated by 1 ... 8 contain the information. At the instants designated by 1', 5', and 6', additional phase changes have been inserted. FIG. 2b shows positive-going needle pulses 11 as are formed in the detector 22. They mark the instants of leading edges in the transmitted data stream 10. FIG. 2c shows negative-going needle pulses 12 as are formed in the detector 22', and FIG. 2d shows the inversion 13 of these pulses. The inverted pulses are used to mark the instants of the trailing edges in the transmitted data stream 10, which are determined in the detector 22'. FIG. 2e shows the sum signal 14, which combines the positive-going pulses 11 and the inversion 13 of the negative-going pulses 12. This sum signal 14 shows the instants of all phase changes of the transmitted data stream 10, i.e., of both the leading and the trailing edges. FIG. 2f shows the clock signal 15 appearing at the output of the monostable multivibrator 29. At each of the instants designated by 1 ... 8 begins a clock pulse of such a duration that a 3:1 markspace ratio is obtained at the average transmission speed. At the instants 1', 5' and 6', too, the monostable multivibrator 29 is driven with the sum signal 14, but as the preceding clock pulse has not yet decayed at these instants, the drive cannot take effect provided that the monostable multivibrator is not retriggerable. This ensures that a clock pulse is formed at each phase change of the transmitted data stream 10 which is significant for the data content, while the inserted phase changes without information content are left out of account. As a comparison between FIGS. 2e and 2f shows, the choice of the mark-space ratio of the clock 15 permits the transmission speed to vary relatively widely, while the clock can still be correctly recovered. The phase change at the instant 1' may be delayed by some time without having any effect. The phase change at the instant 2 may appear some time earlier and still have an effect. Corresponding remarks apply to the other phase changes. Only upon turn-on and in case of disturbances will a clock be false for a short time.

Figure 2G:
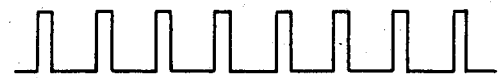
Figure 2H:

If the clock signal 15 is suitably delayed and inverted, the gating slgnal 16 (FIG. 2g) is obtained. If this gating signal 16 is used to clock a storage element 38, directly or indirectly, it is ensured that changes can occur at the output of this storage element only at the instants determined by the gating signal 16. Therefore, no disturbing pulses can be produced. FIG. 2h shows the decoded data stream 17 appearing at the data output 39.

The embodiment of FIG. 1 may be modified in various ways. The noninverting gates 28, 36, and 37 may be replaced with inverting gates if the other polarities are taken into account. The inverter 35 can be dispensed with if the monostable multivibrator 29 has an inverting output.

The delay element 34 can be dispensed with if the differentiators 23 and 23' are replaced with circuits that provide square-wave pulses of suitable length instead of needle pulses. The monostable multivibrator 29 can be replaced or supplemented with a phase-locked loop to enhance transmission reliability in case of disturbances (e.g. due to noise, dropouts). The SR flip-flop 38 may be replaced with a D flip-flop which is clocked by the gating signal 16 and whose data input is fed directly with the transmitted data stream 10 as shown in the alternative with dashed lines in FIG. 1.

I claim:

1. An evaluating circuit for an incoming data stream transmitted as a series of phase changes in two opposite directions occurring at predetermined instants of time, characterized in that it comprises a clock recovery circuit (20) containing one or more detectros (22, 22') which generate output pulse stream(s) which represent said phase changes, the clock recovery circuit (20) containing a generator (29) which generates a clock pulse shorter than the shortest permissible distance between two valid changes of state and longer than half the longest permissible distance between two valid changes of state whenever a phase change is detected by the detector(s) (22, 22') and if the preceding clock pulse has ended, and a data recovery circuit (30) that contains a storage element (38) into which data obtained in the data recovery circuit from the said output pulse stream(s) emerging from said detector(s) is transferred at each clock pulse generated by said clock recovery circuit, the storage element (38) being an SR flip-flop which is set via its set input S when a phase change occurs in one direciton (e.g., as a voltage rise) at an instant determined by the clock signal as the succession of clock pulses, and which is reset via its reset input R when a phase change occurs in the other direction (e.g., as a voltage drop) at an instant determined by the clock signal.

2. An evaluating circuit as claimed in claim 1, characterized in that the storage element (38) is a D flip-flop into which the said incoming data stream is directly transferred at an instant determined by the clock signal generated by said clock recovery circuit.

* * * * *